United States Patent [19]

Bales et al.

[11] Patent Number: 5,579,383
[45] Date of Patent: Nov. 26, 1996

[54] CALLING TERMINAL CONTROLLED CALL COVERAGE

[75] Inventors: Bruce M. Bales, Louisville; Stephen M. Thieler, Boulder, both of Colo.

[73] Assignee: Lucent Technologies Inc., Murray Hill, N.J.

[21] Appl. No.: 493,232

[22] Filed: Jun. 20, 1995

Related U.S. Application Data

[63] Continuation of Ser. No. 23,295, Feb. 26, 1993, abandoned.

[51] Int. Cl.$^6$ .......................... H04M 3/42; H04M 11/00
[52] U.S. Cl. ..................... 379/212; 379/210; 379/214; 379/96
[58] Field of Search ..................... 379/67, 88, 89, 379/90, 93, 96, 100, 164, 165, 201, 204, 210, 211, 212, 213, 214, 233, 243, 245, 266, 355

[56] References Cited

U.S. PATENT DOCUMENTS

| | | | |
|---|---|---|---|
| 4,436,963 | 3/1984 | Cottrell et al. | 379/211 |
| 4,723,273 | 2/1988 | Diesel et al. | 379/211 |
| 4,873,717 | 10/1989 | Davidson et al. | 379/163 |
| 4,879,743 | 11/1989 | Burke et al. | 379/212 |
| 4,961,185 | 10/1990 | Sawada | 370/79 |
| 4,975,941 | 12/1990 | Morganstein | 379/212 |
| 5,018,191 | 5/1991 | Catron et al. | 379/211 |
| 5,023,868 | 6/1991 | Davidson et al. | 379/89 |
| 5,027,384 | 6/1991 | Morganstein | 379/211 |
| 5,029,196 | 7/1991 | Morganstein | 379/210 |
| 5,062,103 | 10/1991 | Davidson et al. | 370/58.1 |
| 5,070,525 | 12/1991 | Szlam et al. | 379/196 |
| 5,159,594 | 10/1992 | Bales et al. | 370/110.1 |
| 5,187,735 | 2/1993 | Herrero Garcia et al. | 379/88 |
| 5,193,110 | 3/1993 | Jones et al. | 379/233 |
| 5,233,648 | 8/1993 | Nakamura | 379/233 |
| 5,291,549 | 3/1994 | Izumi | 379/233 |
| 5,309,511 | 5/1994 | Kotake | 379/201 |
| 5,317,630 | 5/1994 | Feinberg et al. | 379/94 |
| 5,369,695 | 11/1994 | Chakravarti et al. | 379/211 |
| 5,408,527 | 4/1995 | Tsutsu | 379/211 |
| 5,416,834 | 5/1995 | Bales et al. | 379/211 |
| 5,422,942 | 6/1995 | Kakwashima | 379/212 |
| 5,479,496 | 12/1995 | Endo et al. | 379/212 |

FOREIGN PATENT DOCUMENTS

| | | | |
|---|---|---|---|
| 58-165469 | 9/1983 | Japan | 379/211 |
| 1-072651 | 3/1989 | Japan | 379/355 |

OTHER PUBLICATIONS

AT&T Integrated Services Digital Network (ISDN) Basic Rate Interface Specification, Technical Reference, AT&T 801–802–100, May 1989, pp. i–IV–A–59.

"Integrated Services Digital Networks, ISDN: an Introduction", Stollings, 1989, pp. 304–314.

*Primary Examiner*—Krista M. Zele
*Assistant Examiner*—Scott L. Weaver
*Attorney, Agent, or Firm*—John C. Moran

[57] ABSTRACT

A system that allows a calling party to quickly select a call coverage system to be utilized if a call is unanswered. The calling party can preselect the call coverage before the call is placed, and the called telephone terminal automatically transfers the call to the selected call coverage service if the called party does not answer. Alternatively, the called telephone terminal transmits back the available call coverage options if the incoming call is not answered. In response, the calling telephone terminal displays the available call coverage options to the caller, and the caller selects the call coverage option desired. The calling telephone terminal then transmits the selected call coverage option to the called telephone terminal which transfers the call to the selected call coverage service. Also, when the caller wants only to leave a message on a particular call coverage system and not talk to the called party, the caller preselects the call coverage option and requests to only leave a message for the calling telephone terminal (call coverage only). Upon receiving a message defining call coverage only, the called telephone terminal immediately transfers the call to the selected call coverage system.

8 Claims, 5 Drawing Sheets

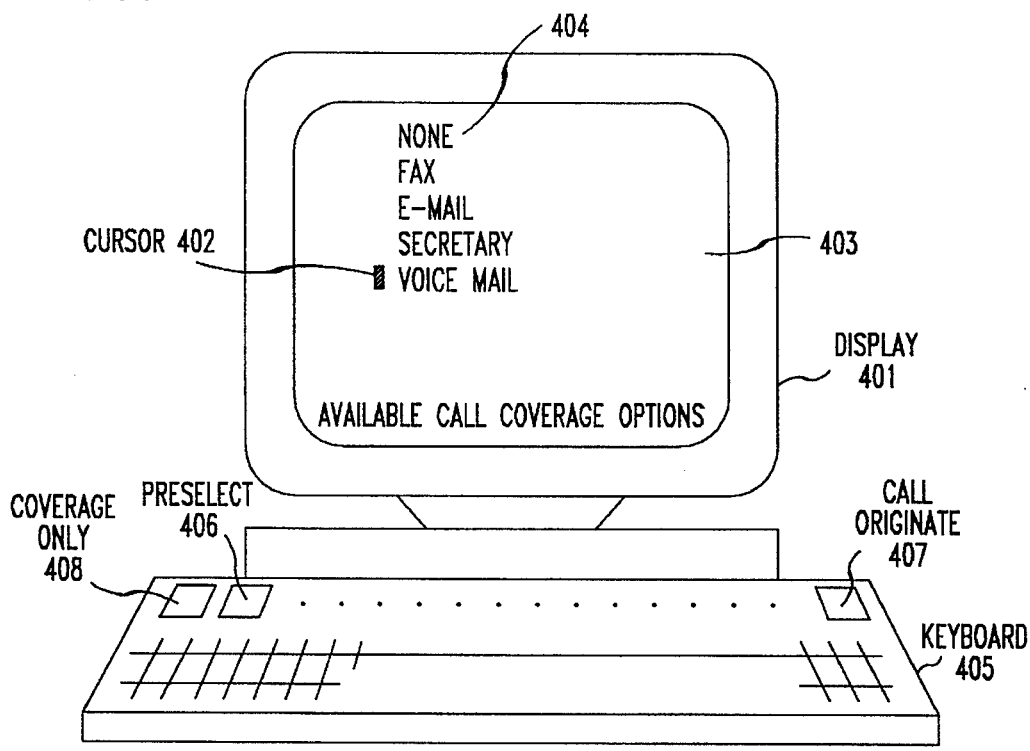
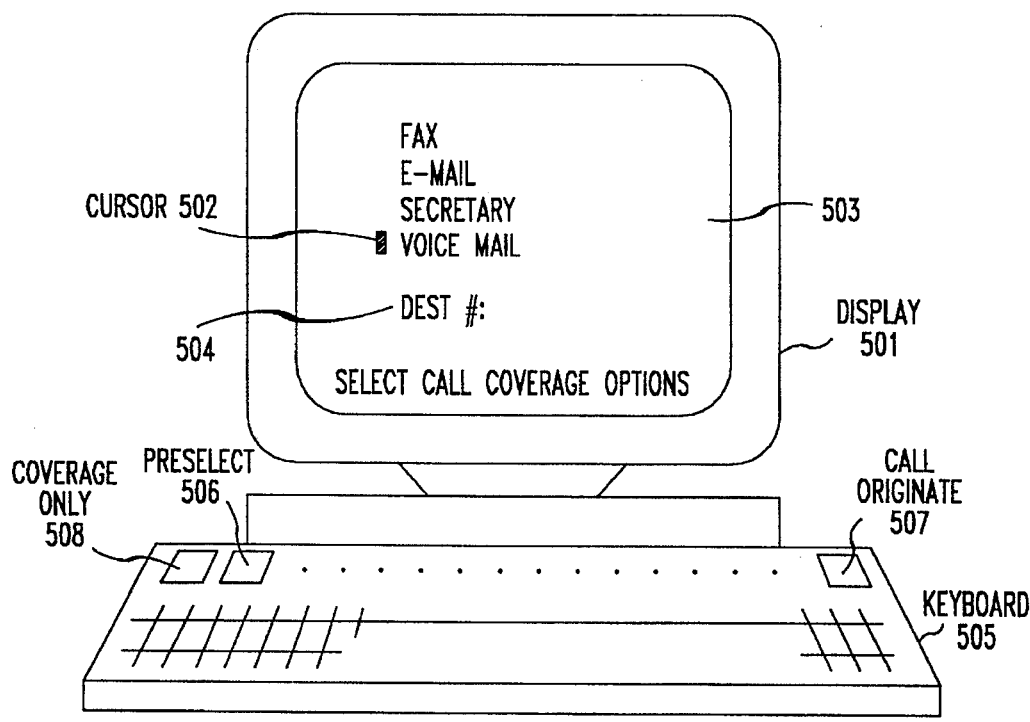

CALLING TERMINAL CONTROLLED CALL COVERAGE

This application is a continuation of application Ser. No. 08/023,295, filed on Feb. 26, 1993, now abandoned.

TECHNICAL FIELD

The present invention relates to telecommunication switching systems and, in particular, to the control of call coverage options.

BACKGROUND OF THE INVENTION

In present day business telecommunications systems, also referred to as PBXs, a caller placing an unanswered call is notified that the call is going to call coverage. However, the caller is given no immediate control over which call coverage system the call will be transferred. In many systems, if a voice mail system is attached to the business telecommunication system, the caller is transferred to the voice mail system, and the voice mail system informs the caller that the caller can leave a voice mail message or be transferred to a secretary. Certain PBXs also display on an alphanumeric display when a call is going to coverage but give no control over which coverage system will be used.

The problem with the prior art call coverage methods is the amount of time required to transfer a call to the voice mail message system, to receive an audio message from the voice mail system describing the available call coverage options, to select the desired call coverage option, and to wait for the voice mail system to make the transfer to the selected call coverage option. More importantly, this method will become more lengthy as other call coverage services are added in addition to a secretary and voice mail system. On many occasions, the caller does not want to talk to the called party but rather wants only to leave a message for the called party either on the voice mail system or with a secretary. This situation often occurs when the calling party is communicating a small amount of information and does not wish to become engaged in a long drawn-out conversation with the called party.

SUMMARY OF THE INVENTION

The aforementioned problems are solved and a technical advance is achieved in the art by an apparatus and method that allow a calling party to quickly select the call coverage system to be utilized. The calling party can preselect the call coverage before the call is placed, and the called telephone terminal automatically transfers the call to the selected call coverage service if the called party does not answer. Alternatively, the called telephone terminal transmits back the available call coverage options if the incoming call is not answered. In response, the calling telephone terminal displays the available call coverage options to the caller, and the caller selects the call coverage option desired. The calling telephone terminal then transmits the selected call coverage option to the called telephone terminal which transfers the call to the selected call coverage service. Also, when the caller wants only to leave a message on a particular call coverage system and not talk to the called party, the caller preselects the call coverage option and requests to only leave a message for the calling telephone terminal (call coverage only). Upon receiving a message defining call coverage only, the called telephone terminal immediately transfers the call to the selected call coverage system.

Other and further aspects of the present invention will become apparent during the course of the following description and by reference to the accompanying drawing.

BRIEF DESCRIPTION OF THE DRAWING

FIG. 4 illustrates a calling telephone terminal displaying call coverage options that are available in one embodiment of the invention, when the call coverage system is preselected;

FIG. 5 illustrates a calling telephone terminal displaying call coverage options that are available, when the call coverage system is not preselected in one embodiment of the invention.

DETAILED DESCRIPTION

Figure 1:
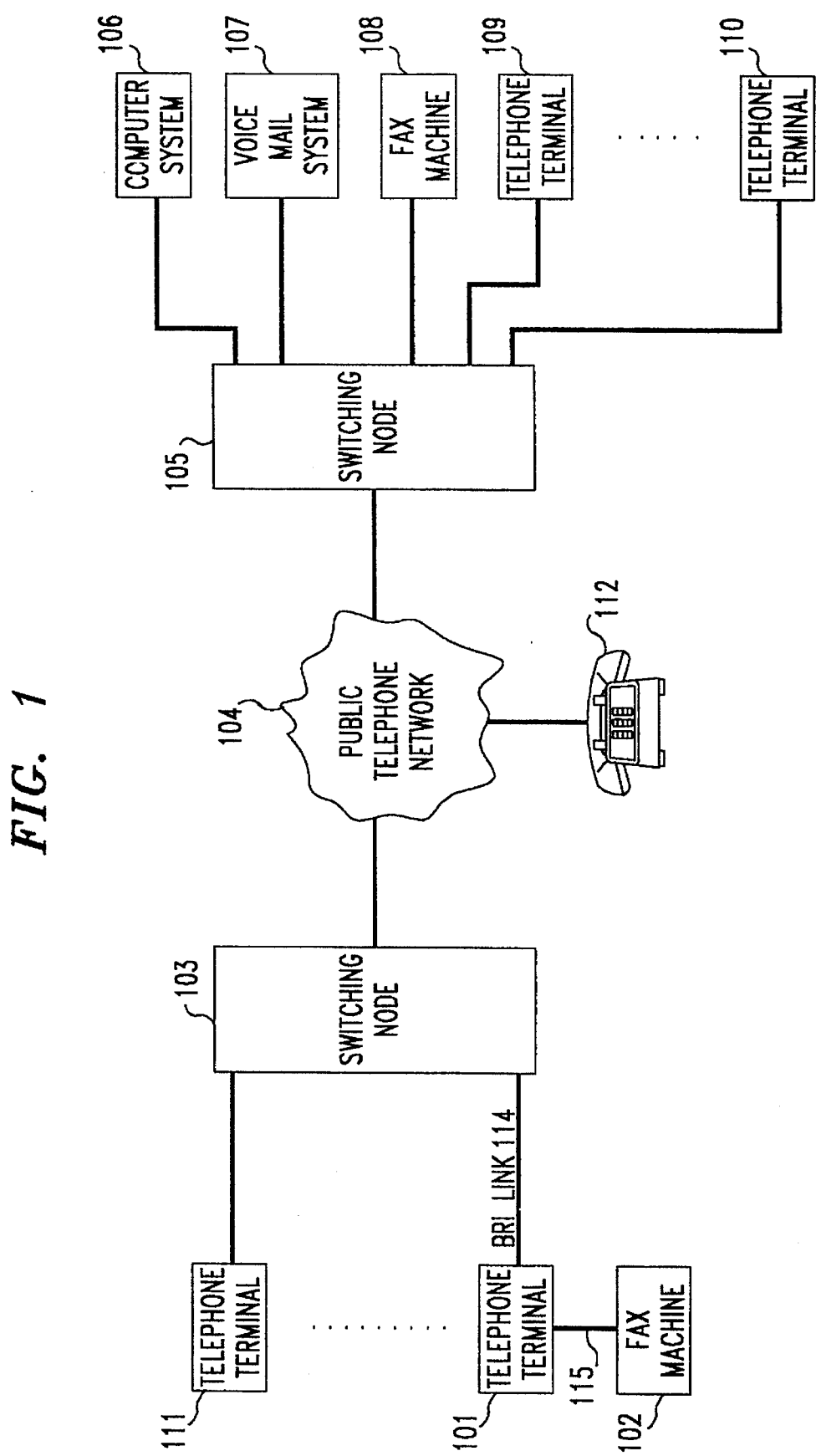
FIG. 1 illustrates, in block diagram form, a system for implementing the invention.

FIG. 1 illustrates a system for implementing the invention. Switching nodes 103 and 105 may be any number of commercially available business telecommunication systems (also referred to as PBXs) or central offices. Advantageously, switching nodes 103 and 105 are switching systems as disclosed in U.S. Pat. No. 5,159,594. Each switching node has a plurality of telephone terminals connected to it, and these telephone terminals may be simple telephone sets or more sophisticated telephone terminals. Switching nodes 103 and 105 are interconnected via public telephone network 104. Switching node 105 provides call coverage via computer system 106, voice mail system 107, a secretary using telephone terminal 110, and fax machine 108.

In accordance with the invention, a caller is provided three procedures for selecting call coverage options. First, the calling party places a call from a calling telephone terminal to a called telephone terminal. The called telephone terminal transmits back to the calling terminal available call coverage options. The caller selects one of these call coverage options, and this selection is transmitted to the called telephone. If the called party does not answer the call, the called telephone terminal transfers the call to the selected call coverage system. Second, the calling party can preselect the call coverage option before placing the call. If the called party does not answer the call, the called telephone terminal transfers the call to the preselected call coverage system. Third, the caller can specify call coverage only and select the desired call coverage option. The called telephone terminal is responsive to call coverage only for immediately transferring the call to the selected call coverage system.

Consider now an example of the first procedure for selecting call coverage options. When a caller using telephone terminal 101 places a call to telephone terminal 109 without predesignating a call coverage option, telephone terminal 109 responds to the incoming call by transmitting to telephone terminal 101 the call coverage options that are available on telephone terminal 109 via the alerting message of the ISDN protocol. (The call coverage options are communicated in a new Information Element, IE, in either codeset 5 or 6). Assuming for this example, that the call coverage options are computer system 106, voice mail system 107, a secretary using telephone terminal 110, and fax machine 108. When the option information is received by telephone terminal 101, the latter telephone terminal displays this information to the caller using telephone terminal 101. The information may be displayed on indicator lights, a computer display screen, etc. depending on the facilities of telephone terminal 101. Assuming that the caller using telephone terminal 101 selects the voice mail option, telephone terminal 101 transmits a user information message of the ISDN protocol to telephone terminal 109 defining that the voice mail call coverage option had been selected. If the called party does not answer the call, telephone terminal 109 is responsive to this message for transferring the call from telephone terminal 101 to voice mail system 107. Voice mail system 107 is responsive to the transferred call to receive the voice mail instructions from the caller in the conventional manner.

Consider now an example of the second procedure for selecting a call coverage option. When the caller using telephone terminal 101 preselects the voice mail call coverage option, this selection is included in the initial call origination message (setup message of the ISDN protocol) transmitted to telephone terminal 109. (The selection is communicated in a new IE in either codeset 5 or 6). In response to this message, telephone terminal 109 gives the called party using telephone terminal 109 the opportunity to answer the call. If the called party does not answer the call, telephone terminal 109 then transfers this call to voice mail system 107. Advantageously, there could be a plurality of voice mail systems, and telephone terminal 109 determines which of these voice mail systems to utilize.

Consider now an example of the third procedure for selecting a call coverage option by using call coverage only. The calling party using telephone terminal 101 preselects the call coverage option to be utilized, and this preselected option is transmitted in the setup message. Telephone terminal 109 responds to the setup message by immediately transferring the call to the selected call coverage option. For example, the caller using telephone terminal 101 wants to send a facsimile document to the fax machine utilized by the user of telephone terminal 109, but does not know the telephone number of the user's fax machine. The caller preselects the fax option, and telephone terminal 101 transmits a originating message with that information to telephone terminal 109. Telephone terminal 109 is responsive to the preselection of the fax option to transfer the call to the fax machine utilized by telephone terminal 109 which is assumed to be fax machine 108. The user of telephone terminal 101 then utilizes fax machine 102 to transmit the facsimile document to fax machine 108. Similarly, the user of telephone terminal 101 could send electronic mail to the user of telephone terminal 109. In response to this setup message, telephone terminal 109 transfers the call to computer system 106 and informs computer system 106 that the electronic message is intended for the user of telephone terminal 109. The user of telephone terminal 101 utilizes a keyboard and display associated with that telephone terminal to send electronic mail to computer system 106.

Figure 2:
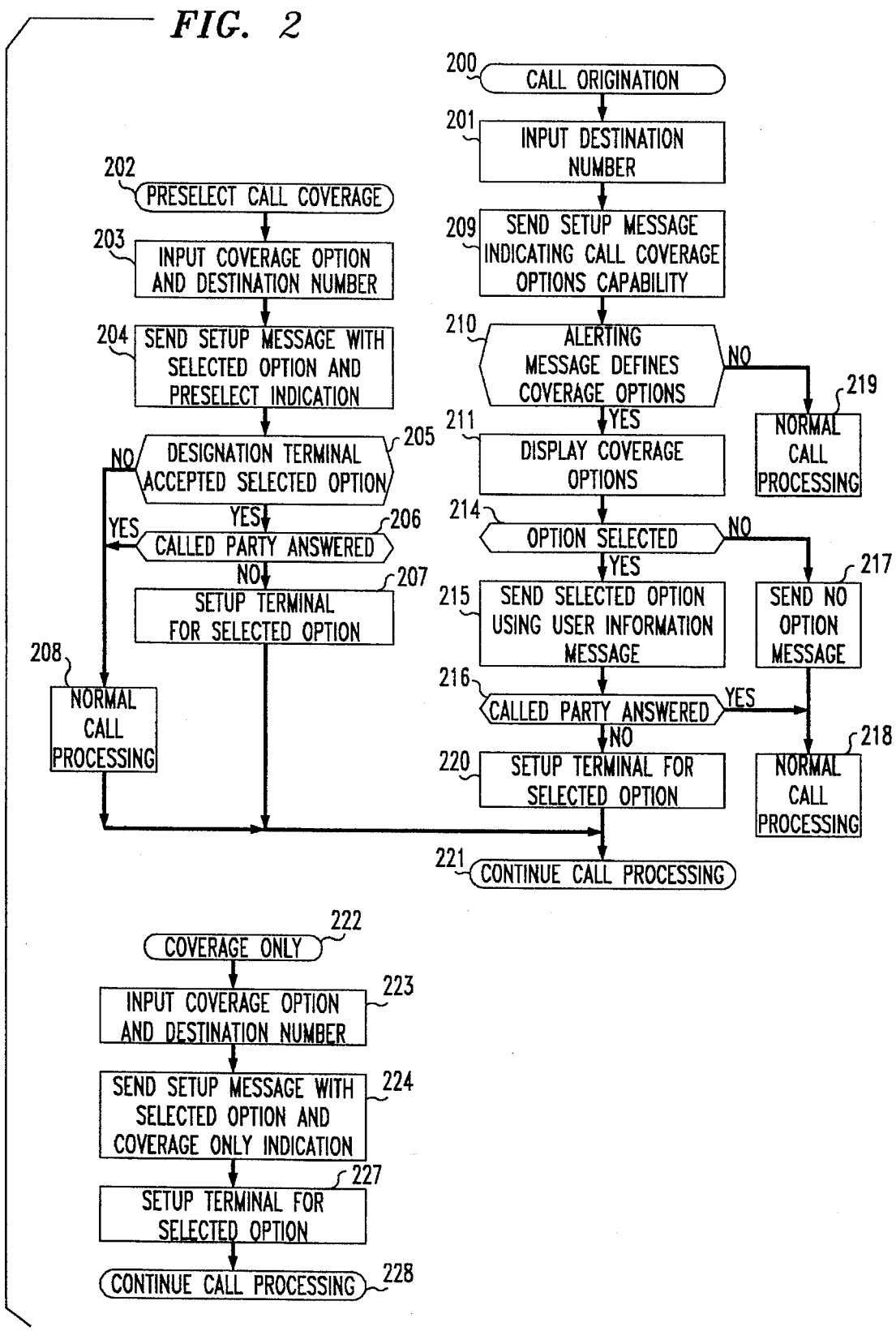
FIG. 2 illustrates, in flowchart form, the functions executed by a calling telephone terminal in one embodiment of the invention.
Figure 3:
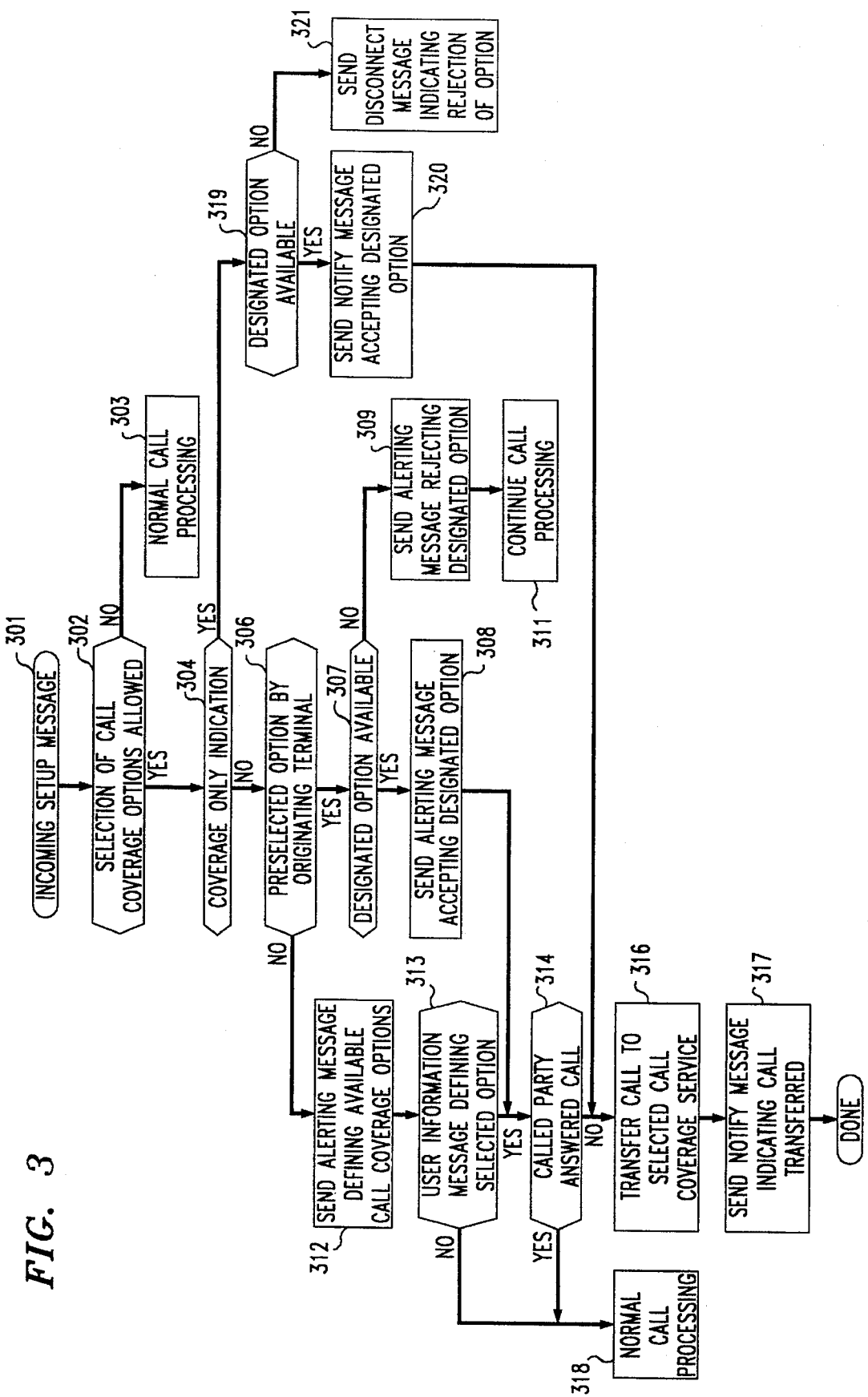
FIG. 3 illustrates, in flowchart form, the functions performed by a called telephone terminal in one embodiment of the invention.

Consider the previous procedures in greater detail utilizing FIGS. 2 through 5. FIG. 2 illustrates the operations performed by calling telephone terminal, FIG. 3 illustrates the operations performed by a called telephone terminal, and FIGS. 4 and 5 illustrate a telephone terminal such as telephone terminal 101 being utilized as a calling telephone terminal. Consider now in greater detail an example of the first procedure where the calling party using telephone terminal 101 places a call to telephone terminal 109 without preselecting a call coverage option. The calling party actuates call originate button 407, as illustrated in FIG. 4, and telephone terminal 101 executes block 201 of FIG. 2 via entry point 200. Block 201 accepts the called telephone number from keyboard 405 as the calling party enters that number. Block 209 is then executed which transmits a setup message to telephone terminal 109 via switching node 103, public telephone network 104, and switching node 105. The setup message transmitted by block 209 indicates that the calling telephone terminal has call coverage options capability. Decision block 210 is then executed and waits for an alerting message from called telephone terminal 109. If called telephone terminal 109 has call coverage options capability, it transmits in the alerting message (in an IE in either codeset 5 or 6) to calling telephone terminal 101 what these call coverage options are.

If decision block 210 determines that no call coverage options are defined in the alerting message, control is transferred to block 219 which performs normal call processing operations. However, if call coverage options are defined, block 211 is executed which displays these call coverage options to the caller. FIG. 4 illustrates an example of the call coverage options displayed on telephone terminal 101 that were received from called telephone terminal 109. The calling party then selects one of these options by positioning cursor 402 and hitting the entry key on keyboard 405. In the present example, it is assumed that the calling party has selected voice mail entry 403. Control is then transferred to block 215 which utilizes a user information message to transmit to called telephone terminal 109 the information that the voice mail option has been selected.

Returning to decision block 214, if the calling party selected NONE, entry 404, control would have been transmitted to block 217. The latter block would utilize a user information message to transmit to called telephone terminal 109 the fact that no call coverage option had been selected. Block 217 then transfers control to block 218 which performs normal call processing.

Returning to decision block 216, the latter decision block determines whether or not the called party answered from a message received from called telephone terminal 109. If a connection message is received from called terminal 109, the called party has answered and control is passed to block 218. However, if a notify message indicating a transfer is received from called telephone terminal 109, then block 220 is executed, and calling telephone terminal 101 is set up to implement the selected call coverage option. In the present example, where the call coverage option is the voice mail option, calling telephone terminal 101 processes this as a normal call.

Consider now in greater detail an example of the second procedure for selecting call coverage options. In order to preselect the call coverage option before placing a call, the calling party activates preselect button 506 of FIG. 5. In response to activation of preselect button 506, calling telephone terminal 101 executes block 203 via entry point 202. Block 203 displays the information illustrated on display 501 of FIG. 5 and waits until the calling party has selected a coverage option and entered a telephone number for the called telephone. Block 203 first allows the calling party to select the call coverage option by positioning the cursor 502 next to the desired option and actuating the entry key on keyboard 505. Next, block 203 positions the cursor to the right of entry 504 and allows the calling party to enter the called telephone number. Block 203 then transfers control to block 204 which sends a setup message to the destination telephone terminal (which in the present example is telephone terminal 109). The setup message includes the information designating the selected option and provides a preselect indication.

Control is then transferred to decision block 205. The latter decision block awaits an alerting message from called telephone terminal 109. If a received alerting message defines that the called telephone terminal is capable of providing call coverage option capability and the called option is available, control is transferred to decision block 206. If the called telephone terminal does not meet these two requirements, control is transferred to block 208 which processes the call in a normal manner.

Returning to decision block 206, if the called party answers the call, control is transferred to block 208. (Telephone terminal 109 sends a connection message if called party answers.) However, if the called party does not answer the call, called telephone terminal 109 transfers the call to the selected call coverage system and sends a notify message indicating a transfer back to calling telephone terminal 101. Decision block 206 detects this notify message and transfers control to block 207. The latter block then performs the necessary operations within telephone terminal 101 to perform the selected call coverage option.

Consider now in greater detail an example of the third procedure of selecting call coverage options. In order to select a particular call coverage option of a called telephone terminal for call coverage only, the calling party activates coverage only button 508 of FIG. 5. The actuation of this button executes block 223 via entry point 222. Block 223 performs the same operations as performed by block 203 which was previously described. Control is then transferred to block 224 which transmits a setup message that includes the selected option and an indication that coverage only is being requested. Control is transferred to block 227 which performs the same operations as previously described for block 207, and control is then transferred from block 227 to block 228. If the called telephone terminal does not have the option available, it responds with a disconnect message, and block 228 abandons the call in response to the disconnect message.

FIG. 3 illustrates the operations performed by a called telephone terminal in implementing the invention. Decision block 302 is executed in response to a setup message received via entry 301. Decision block 302 determines if the called telephone terminal allows the calling telephone terminal to determine call coverage option. Note, if the called telephone terminal does not support the call coverage options capability, all information received from the calling telephone terminal concerning call coverage options is simply ignored and the call is processed in a normal manner by block 303. If the selection of call coverage options capability does not exist, control is transferred to block 303 by decision block 302. If the answer to decision block 302 is yes, control is transferred to decision block 304 which checks to see if the coverage only indication is set in the setup message. (The coverage-only indication defines that the third procedure is being used.) If the answer is yes, control is transferred to decision block 319. Decision block 319 determines whether or not the designated option is available on called telephone terminal 109. If the answer is no, then block 321 is executed to send a disconnect message back to calling telephone terminal 101 rejecting the selected option. Calling telephone terminal 101 is responsive to this disconnect message to abandon the call. If the answer to decision block 319 is yes, then block 320 is executed which sends back a notify message accepting the designated option. Next, block 316 is executed to transfer the call to the selected call coverage service; and block 317 is executed to transmit a notify message to the calling telephone terminal indicating that the call has been transferred to coverage.

Returning to decision block 304, if the answer is no, control is transferred to decision block 306 which checks if the preselect indication is set in the setup message. (The preselect indication defines that the second procedure is being used.) If the preselect indication is set, control is transferred to decision block 307 which checks to see if the selected call coverage option is available on called telephone terminal 109. If the answer is no, control is transferred to block 309 which transmits a rejection of the designated option via an alerting message to calling telephone terminal 101. Called telephone terminal 109 then continues with normal call processing by execution of block 311. If telephone terminal 101 abandons the call, block 311 will also abandon the call.

If the answer to decision block 307 is yes, control is transferred to block 308 which transmits an acceptance of the designated option to calling telephone terminal 101 using an alerting message and transfers control to decision block 314. Decision block 314 determines if the called party answers the call by waiting a predetermined amount of time for the called party to answer. If the called party does not answer, block 316 is executed which transfers the call to the selected call coverage service and notify message indicating transfer is sent by block 317. If the called party does answer the call, then block 318 is executed to perform normal call processing.

Returning now to decision block 306. If the answer in decision block 306 is no, block 312 is executed to send an alerting message to calling telephone terminal 101 which defines the available call coverage options. (The first procedure is being used.) Decision block 313 then waits for a user information message from calling telephone terminal 101 defining what the selected option is. After execution of block 313, blocks 3 14 through 318 are executed as was previously described.

Figure 6:
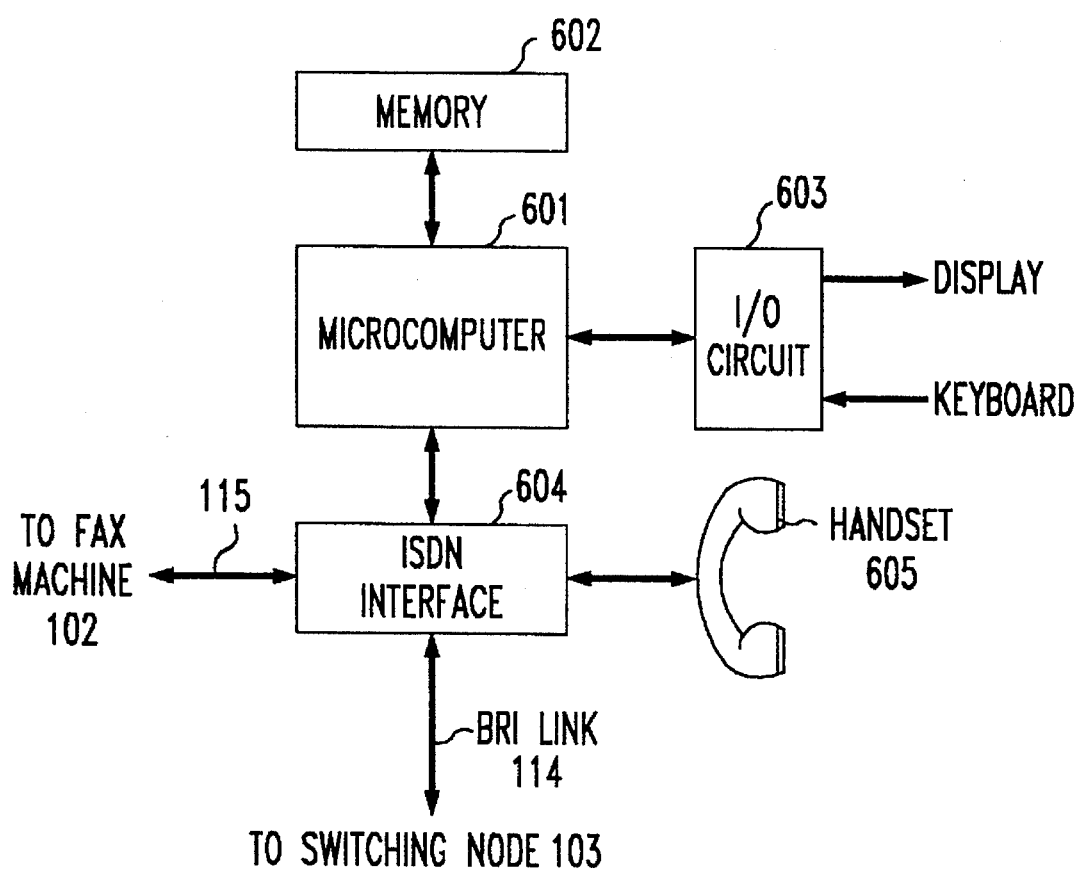
FIG. 6 illustrates, in block diagram form, a telephone terminal.

FIG. 6 illustrates, in greater detail, telephone terminal 101. The telephone terminal is controlled by microcomputer 601 which executes the programs illustrated in flowchart form in FIGS. 2 and 3. These programs are stored in memory 602. I/O circuit 603 is utilized to interface display 401 and keyboard 405 to microcomputer 601. Microcomputer 601 communicates with switching node 103 via ISDN interface 604. The latter interface performs the necessary functions to perform the low level ISDN protocol functions and to interface handset 605 and fax machine 602 to switching node 103 for the purposes of telephone communications.

Whereas, the previous description has described the software routines illustrated in FIGS. 2 and 3 as being executed in the telephone terminals, these software routines could be executed by terminal management software applications being executed in the switching nodes.

It is to be understood that the above-described embodiments are merely illustrative of the principles of the invention and that other arrangements may be devised by those skilled in the art without departing from the spirit and scope of the invention. In particular, one skilled in the art can readily envision that a user could preprogram a telephone terminal to automatically send the user's preferred call coverage option, when each call is placed. Further, the calling and called telephone terminals could automatically negotiate call coverage options.

We claim:

1. A method for designating a call coverage system for a call initiated by a calling telecommunication terminal under control of a user to a called telecommunication terminal that has call coverage provided by a plurality of call coverage systems, comprising the steps of:

transmitting a call origination message to the called telecommunication terminal by the calling telecommunication terminal;

including a call coverage capability indication in the call origination message transmitted to the called telecommunication terminal;

transmitting identities of the plurality of the call coverage systems to the calling telecommunication terminal by the called telecommunication terminal in response to the call coverage capability indication;

determining an identity of a selected one of the plurality of the call coverage systems from the transmitted identities of the plurality of the call coverage systems by the calling telecommunication terminal under control of the user;

transmitting the identity of the selected one of the plurality of the call coverage systems to the called telecommunication terminal by the calling telecommunication terminal; and transferring the call to the selected one of the plurality of the call coverage systems by the called telecommunication terminal in response to the identity of the selected one of the plurality of the call coverage systems.

2. The method of claim 1 wherein the step of transmitting the identity of the selected one of the plurality of the call coverage systems further comprises the step of transmitting the identity of the selected one of the plurality of the call coverage systems via a user information message to the called telecommunication terminal by the calling telecommunication terminal.

3. The method of claim 2 wherein the step of transferring comprises the step of waiting a predefined amount of time to allow a user of the called telecommunication terminal an opportunity to answer the call before transferring the call to the selected one of the call coverage systems.

4. The method of claim 3 wherein the step of transferring further comprises the step of transmitting a notification message to the calling telecommunication terminal by the called telecommunication terminal to inform the calling telecommunication terminal that the call has been transferred.

5. An apparatus for designating a call coverage system for a call initiated by a calling telecommunication terminal under control of a user to a called telecommunication terminal that has call coverage provided by a plurality of call coverage systems, comprising:

means for transmitting by the calling telecommunication terminal a call origination message to the called telecommunication terminal;

means for including a call coverage capability indication in the call origination message transmitted to the called telecommunication terminal;

means for transmitting identities of the plurality of the call coverage systems to the calling telecommunication terminal in response to the call coverage capability indication;

means for determining in the calling telecommunication terminal under control of the user an identity of a selected one of the plurality of the call coverage systems from the transmitted identities;

means for transmitting in the calling telecommunication terminal the identity of a selected one of the plurality of the call coverage systems to the called telecommunication terminal; and means in the called telecommunication terminal for transferring the call to the selected one of the call coverage systems in response to the identity of the selected one of the plurality of the call coverage systems.

6. The apparatus of claim 5 wherein the means for transmitting the identity of the selected one of the plurality of the call coverage systems further comprises means for transmitting the identity of the selected one of the plurality of the call coverage systems via a user information message to the called telecommunication terminal.

7. The apparatus of claim 6 wherein the means for transferring comprises means for waiting a predefined amount of time to allow a user of the called telecommunication terminal an opportunity to answer the call before transferring the call to the selected one of the call coverage systems.

8. The apparatus of claim 7 wherein the means for transferring further comprises means for transmitting a notification message to the calling telecommunication terminal to inform the calling telecommunication terminal that the call has been transferred.

* * * * *